LEVELLING DEVICES

Filed Oct. 27, 1966 7 Sheets-Sheet 1

Aug. 27, 1968 N. BROCKLEBANK ET AL 3,398,967

LEVELLING DEVICES

Filed Oct. 27, 1966 7 Sheets-Sheet 2

Aug. 27, 1968 N. BROCKLEBANK ET AL 3,398,967

LEVELLING DEVICES

Filed Oct. 27, 1966 7 Sheets-Sheet 4

LEVELLING DEVICES

Filed Oct. 27, 1966 7 Sheets-Sheet 5

Aug. 27, 1968 N. BROCKLEBANK ET AL 3,398,967

LEVELLING DEVICES

Filed Oct. 27, 1966 7 Sheets-Sheet 7

United States Patent Office 3,398,967
Patented Aug. 27, 1968

3,398,967
LEVELLING DEVICES
Norman Brocklebank, Beverley, and Bert Richardson and Jesse Acum, Hull, England, assignors to Priestman Brothers Limited, Hull, England, a British company
Filed Oct. 27, 1966, Ser. No. 589,936
Claims priority, application Great Britain, Nov. 1, 1965, 46,099/65; Mar. 14, 1966, 11,085/66
14 Claims. (Cl. 280—6)

Many occasions arise in which the superstructure of an apparatus having a superstructure mounted on a substructure must be maintained level or upright irrespective of the flatness of, for example, the ground on which the substructure rests. A typical example is found in the civil engineering field when the superstructure of tower cranes and other high machines must be maintained upright relatively to a chassis, which may be mobile, and rests on the ground. In our specification No. 1,048,722 we have proposed solutions to this problem in the case of civil engineering machines by providing hydraulically operated rams at four corners of the machine. The stability of the superstructure however is dependent upon the maintenance of oil pressure to the rams. Other prior proposals utilize outriggers with adjustable elephant pads but the pads have relatively small areas in contact with the ground across which a consequently large pressure has to be transmitted.

In accordance with the present invention, in apparatus having a substructure and a superstructure both with a nominal vertical axis, the superstructure is mounted on the substructure through an intermediate member which is coupled to the substructure, by a first rotary bearing having an axis of rotation coincidental with the nominal vertical axis of the substructure, and to the superstructure, by a secondary rotary bearing having an axis of rotation equally inclined to the nominal vertical axis of the substructure and to the nominal vertical axis of the superstructure, and means are provided for producing relative rotation between the intermediate member and substructure through the first rotary bearing and between the intermediate member and the superstructure through the second rotary bearing whereby when the substructure is located with its nominal vertical axis offset at a small angle to the true vertical, the nominal vertical axis of the superstructure can be adjusted to be truly vertical.

With this arrangement relative rotation of the two parts of the second rotary bearing adjusts the inclination of the nominal vertical axis of the superstructure relatively to the nominal vertical axis of the substructure between an angle of 0° when he two nominal vertical axes are inclined in opposite directions in a common plane with the axis of rotation of the second bearing, and a maximum angle of inclination, equal to twice the inclination between the axis of rotation of the second bearing and the two nominal vertical axes, when the nominal vertical axes are inclined to the axis of rotation of the second bearing in a common plane in the same direction. Relative rotation between the two parts of the first bearing is arranged to bring the inclination which is set between the two nominal vertical axes into the vertical plane containing the line of maximum slope of the substructure so that the nominal vertical axis of the superstructure is truly vertical.

If it necessary for the superstructure to be able to slew about its nominal vertical axis relatively to the substructure, and this is particularly the case with cranes and other civil engineering machines, the apparatus will in addition be provided with a second intermediate member through which the superstructure is mounted on the first intermediate member, the second intermediate member being coupled to the first intermediate member through the second rotary bearing and to the superstructure through a third rotary bearing having an axis of rotation coincidental with the nominal vertical axis of the superstructure. Once the superstructure has been levelled, normal slewing of the superstructure can then take place by relative rotation of the parts of the third bearing. In order to provide a rigid base for slewing of the superstructure before and after levelling, locks are preferably provided for locking the first and second intermediate members against rotation relatively to the substructure. Although the locks may be friction brakes, it is important to avoid backlash when the superstructure changes its direction of slewing and consequently we prefer to arrange for each intermediate member to be connected to a toothed gear which rotates when the intermediate member rotates relatively to the substructure and arranging for the intermediate members to be locked against rotation relatively to the substructure by means of fluid cylinder operated dogs which can be forced into engagement with the teeth of the toothed gears.

Preferably the first and second intermediate members are interconnected by gearing constraining them to rotate in opposite senses relatively to the substructure during levelling. The advantage of this is that the two intermediate members can be set ready for levelling with the axis of rotation of the second bearing in a plane transverse to the line of greatest slope of the substructure and with the nominal vertical axis of the superstructure and substructure parallel to one another. If the two intermediate members are then rotated in opposite directions in the correct sense relatively to the substructure, the nominal vertical axis of the superstructure will be gradually raised in the vertical plane containing the line of maximum slope of the substructure to a truly vertical position.

The gearing may comprise two meshing gear sectors one connected to each of the intermediate members, the sectors being pivotally mounted on a sector carrier which is rotatably mounted on the substructure about the nominal vertical axis of the substructure but which can be locked relatively to the substructure, the arrangement being such that when the sector carrier is locked relatively to the substructure, the intermediate members can be rotated in opposite senses to level the superstructure but when the sector carrier is unlocked relatively to the substructure, both the intermediate members are able to rotate in the same sense with the sector carrier relatively to the substructure.

Preferably, the sector carrier is connected to a toothed gear which rotates when the sector carrier rotates relatively to the substructure, and the carrier can be locked relatively to the substructure by means of a fluid cylinder operated dog which can be forced into engagement with the teeth of the toothed gear.

Although both the intermediate members may be individually positively driven to rotate them relatively to the substructure, for example by separate hydraulic or electric motors, it is only necessary for one of the intermediate members to be positively rotated relatively to the substructure during levelling, the other intermediate member being simultaneously rotated in the opposite sense relatively to the substructure through the gearing interconnecting the two intermediate members.

The intermediate members may then carry abutments which come into engagement with one another when the two intermediate members move into an orientation relatively to one another about the second rotary bearing such that the nominal vertical axes of the substructure and superstructure are parallel with one another, whereby when the sector carrier is unlocked from the substructure and the positively driven intermediate member is rotated relatively to the substructure in a direction to maintain the abutments in engagement with one another, the two intermediate members rotate together in the same sense relatively to the substructure without interfering with their relative orientation. In this way, by positively rotating only one of the intermediate members, the intermediate members can be prepared for levelling by swinging them together with the abutments in engagement with one another to the position from which they will be rotated in opposite senses relatively to the substructure to raise the nominal vertical axis of the superstructure to the true vertical.

When only one of the intermediate members is positively driven, it may be driven during leveling by a motor provided on the superstructure or substructure for this purpose alone but preferably the power which is available on the machine for slewing the superstructure, and which is not used while levelling is taking place, is used for levelling as well. For this purpose the positively driven intermediate member is the second intermediate member which is formed with an annulus gear concentric with the axis of rotation of the third rotary bearing, the annulus gear meshing with a driven pinion carried by the superstructure and means being provided for locking the superstructure against rotation relatively to the substructure, whereby when the intermediate members are locked and the superstructure is unlocked relatively to the substructure and the pinion is driven the superstructure slews but when the intermediate members are unlocked and the superstructure is locked relatively to the substructure and the pinion is driven the intermediate members rotate relatively to the substructure.

The superstructure may be locked against rotation relatively to the substructure by means of a brake or other lock which takes a reaction directly from the substructure but preferably the strain involved in such a reaction is relieved by the use of a leg which is carried by the superstructure and is arranged to be lowered into frictional engagement with the ground during levelling. The leg is preferably lowered into engagement with the ground at one end of a contour line passing through the centre of the superstructure perpendicularly to the line of maximum slope of the ground. Indeed, legs may be positioned at both ends of this contour line. In other words, the leg or each leg will be lowered substantially in the plane containing the axes of rotation of the three bearings immediately before the intermediate members are rotated relatively to one another to bring the superstructure level. The purpose of positioning the leg or legs on this contour line is that as the superstructure is levelled it will tilt about this contour line, or at least about an axis close to and parallel to this line, so that the length of the leg will require the minimum alteration during the levelling operation, and in practice may not need to have its length altered at all.

In order to indicate to the operator when the two intermediate members, with the abutments in engagement with one another, have been appropriately oriented relatively to the superstructure ready for levelling, we preferably provide the second intermediate member and superstructure with a first cam and cam follower which cooperate and operate a switch when the correct orientation has been reached. Furthermore, the second intermediate member and the superstructure may carry a second cam and cam follower which cooperate and operate a second switch when the two intermediate members have rotated in opposite senses relatively to the superstructure and substructure during levelling away from the position in which the first switch is operated by a predetermined limiting angle for safety. This angle is preferably between 75° and 80°, and less than 90° which is the top dead centre position.

Although the invention is applicable to the levelling of the superstructure of any rigs, masts, or other apparatus, it is preferably applicable to civil engineering machines such as cranes, and particularly mast cranes. When the apparatus is a civil engineering machine, the superstructure will include a bedplate and a substructure may consist of a crawler mounted chassis, the intermediate members then being wedge shaped rings through which a transmission shaft extends from a motor on the bedplate to drive crawler tracks of the chassis.

One example of a tower crane constructed in accordance with the present invention is illustrated in the accompanying drawings in which:

FIGURES 1 to 5 inclusive are diagrammatic views showing successive steps in levelling the crane on site;

Figure 1A:
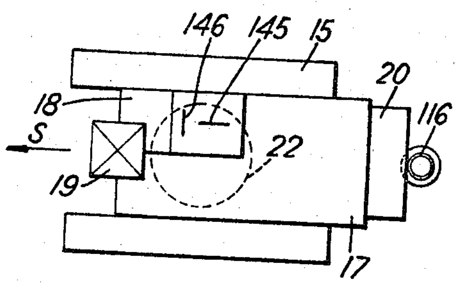
Figure 1B:
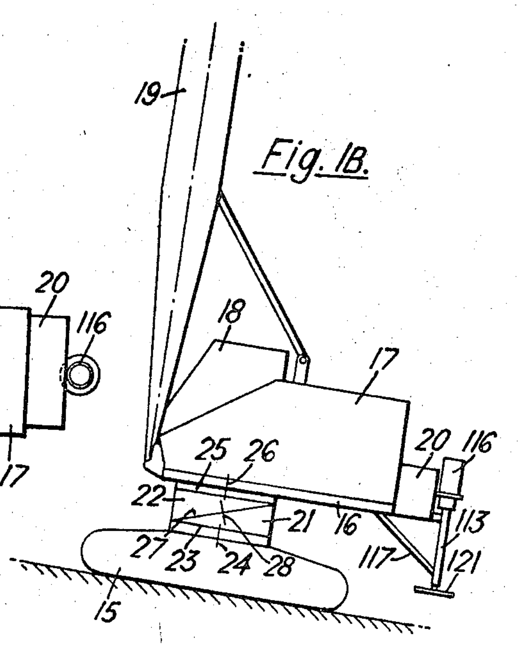

As shown in FIGURES 1A and 1B, the crane has a crawler mounted chassis 15 forming a substructure, and superstructure mounted on a bedplate 16. The superstructure consists, in addition to the bedplate 16, of a motor housing 17, an operator's cabin 18, a mast 19, and the usual counterweight 20.

The bedplate 16 of the superstructure is mounted on the chassis 15 by means of a turret consisting of two wedge-shaped rings 21 and 22 forming the first and second intermediate members. The wedge ring 21 is rotatably mounted on the chassis 15 through a first bearing 23 having an axis of rotation 24 which is a nominal vertical axis of the chassis 15 and will be truly vertical when the chassis is standing on truly horizontal ground. The superstructure is mounted on the second wedge ring 22 by means of a third rotary bearing 25 having an axis of rotation 26 which is truly vertical when the bedplate 16 is truly horizontal. The second wedge ring 22 is mounted on the first wedge ring 21 through a second rotary bearing 27 having an axis of rotation 28 which is equally inclined to the axes 24 and 26. FIGURE 1B shows the rings 21 and 22 oriented with their diameters of maximum slope 180° out of phase with one another so that the axes 24 and 26 are parallel if not necesarily coincidental with one another.

The construction and operation of the levelling machinery consisting essentially of the wedge rings 21 and 22 and the three rotary bearings 23, 27 and 25, are illustrated in greater detail in FIGURES 6 to 13. As shown in these figures, and particularly in FIGURES 6 and 7, the chassis has a centre frame including a pair of transverse box beams 29. Rigidly bolted on these beams 29, is a fabricated structure including a transmission tunnel 30, a gear box 31, a top plate 32, bearings 33, a lateral platform 34, and a tubular support 35 which projects upwards through the wedge ring 21 and is mounted on a spider 36. Rigidly mounted on the top plate 32 is a ring 37 which forms the outer race for the gearing 23. The inner race of the bearing 23 is formed by a composite two part ring 38 forming part of the wedge ring 21 which is fabricated from a cylindrical part 39, and annular plates 40 and 41 all interconnected by webs 42. The rings 37 and 38 define between them an annular passageway of square section containing rollers 43 the axes of which are inclined at 45° to the rotary axis 24, the axes of alternate rollers 43 being inclined in opposite directions relatively to the axis 24. This bearing, known as a cross roll bearing, is capable of supporting the tilting stresses involved during the working of the tower crane.

Similarly to the wedge ring 21, the wedge ring 22 is also fabricated from a cylindrical part 43, and annular plates 44 and 45 all interconnected by webs 46. Rigidly bolted to the ring 44 is a ring 47, similar to the ring 37, but forming the outer race of the cross roll bearing 27, the inner race of which is formed by a composite two part ring 48 bolted to the plate 41 of the wedge ring 21. The bearing 25 is also a cross roll bearing and its outer race is formed by a composite two part ring 49 bolted to the plate 45 of the wedge ring 22. The inner race of the bearing 25 is formed by another composite two part ring 50 rigidly secured to the underside of the bedplate 16.

A tubular support 51 is rigidly fixed to the bedplate 16 and extends downwards through the wedge ring 22. A tubular driving shaft 56, which uses the support 51 as a bearing, extends through the support 51 and is connected through a universal joint to the top of a similar tubular driving shaft 58 which uses the support 35 as a bearing and extends through this support into the gear box 31. The universal joint between the shafts 56 and 58 consists of a plate 52 formed with two holes 53 and rigidly fixed to the bottom of the shaft 56. A similar plate 54 is rigidly fixed to the upper end of the shaft 58 and has welded to it two pins 55 which extend one through each of the holes 53 with an appreciable clearance.

At its upper end the driving shaft 56 is provided with a driving pinion 59 and dog clutch 60 and at its lower end the shaft 58 is provided with a bevel gear 61 which will in use be connected to the crawler tracks of the chassis through gearing (not shown) in the gear box 31 and transverse transmission shafts 62 in the tunnel 30. In this way the crawler tracks of the chassis can be driven from a motor mounted on the bedplate 16.

The loose interconnection provided by the pins 55 and the universal joint 57 is sufficient to locate the two lengths of driving shaft 56 and 58 relatively to one another during stationary working on site, after levelling when the axes of the two shafts may be offset at an angle. However, before the chassis is driven along, and this is the only occasion when the driving shaft has to rotate, the nominal vertical axes 24 and 26 of the chassis and superstructure, and hence of the two parts of the driving shaft will always have been realigned. Electrical, hydraulic and/or pneumatic pipes pass down through tubular linings in the driving shafts 56, 58 from the bedplate to the chassis, the lining being connected by a conventional universal joint 57.

Figure 7:
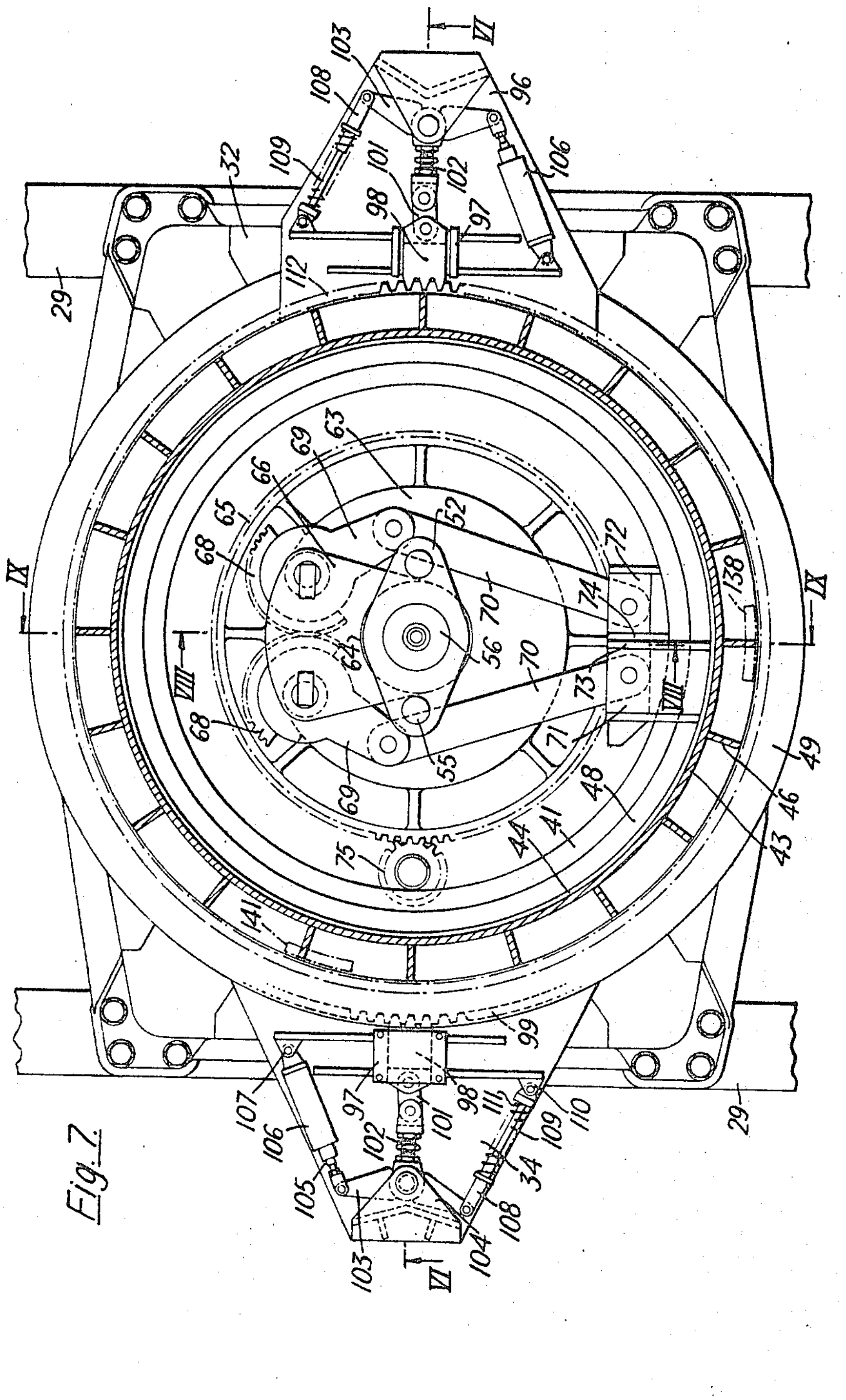
FIGURE 7 is a horizontal section taken on the line VII—VII in FIGURE 6.
Figure 9:
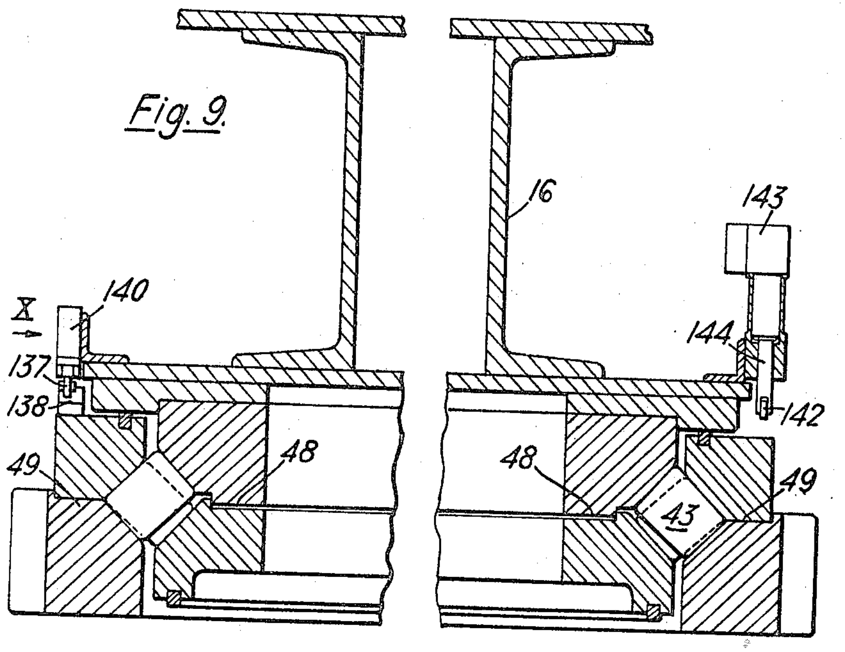
FIGURE 9 is a scrap vertical section illustrating cooperating cam and followers on the bedplate and upper wedge ring and taken on the line IX—IX in FIGURE 7.
Figure 10:
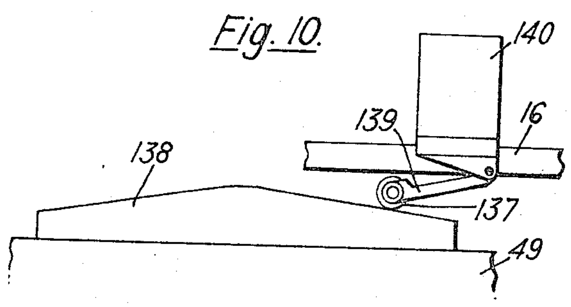
FIGURE 10 is a diagrammatic elevation taken on the arrow X in FIGURE 9.
Figure 11:
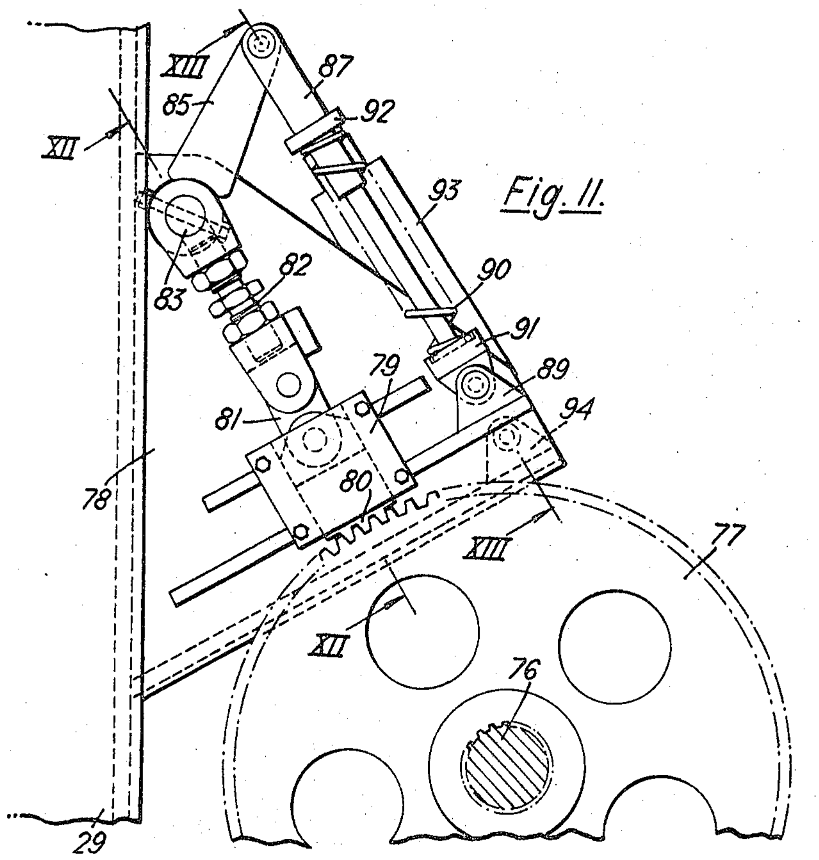
FIGURE 11 is a plan of a lock for a sector carrier of the levelling machiner.
Figure 12:
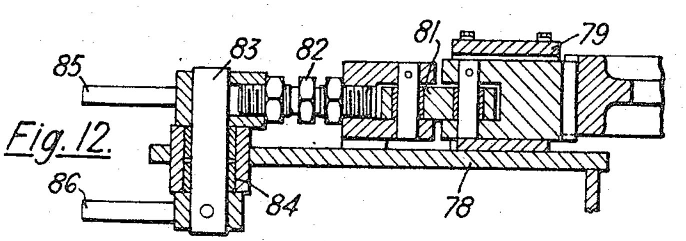
FIGURE 12 is a section taken on the line XII—XII in FIGURE 11.
Figure 13:
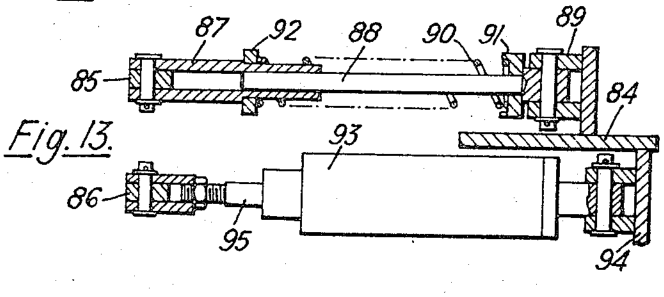
FIGURE 13 is a section taken on the line XIII—XIII in FIGURE 11.

A stepped pinion 63 has a hub 64, which is rotatably mounted on a bearing around the support 35, and a ring of teeth 65. Integrally formed with the hub 64 is a part sector-shaped plate 66 which cooperates with a horizontal arcuate part 67 of the pinion 63 to provide pivotal mountings for two meshing gear sectors 68. These sectors are rigidly formed on levers 69 which in turn are connected through kite bearings and pivotal links 70 one to a bracket 71 on the upper wedge ring 22 and the other to a similar bracket 72 on the lower wedge ring 21. These brackets 71 and 72, although naturally at different height, have offset abutments 73 and 74 which are at the same height and are shown in FIGURE 7 in engagement with one another. The teeth 65 on the pinion 63 mesh with a pinion 75 keyed to the upper end of a shaft 76 which is rotatably mounted in the bearings 33 and has keyed to its lower end a pinion 77 of larger diameter than the pinion 75. As shown in FIGURE 11, the pinion 77 is provided with a locking mechanism mounted on a web 78 carried by the adjacent cross beam 29. The mechanism comprises a linear guide 79 rigidly fixed to the web 78. A toothed dog 80 slides in the guide 79 radially of the pinion 77 into and out of engagement with the pinion teeth. The dog 80 is mounted on the end of a toggle consisting of a short pivotal link 81 and a longer link 82 of adjustable length which is keyed to a short shaft 83 extending right through a bearing 84 supported by the web 78. On each side of the web 78, the shaft 83 is keyed to a different one of two levers 85 and 86. The lever 85 is pivoted to the end of a sleeve 87 which slides over a rod 88 which is pivotally mounted in turn on a bracket 89 rigidly mounted on the web 84. A helically coiled compression spring 90 acts between an annular flange 91 on the rod 88 and an annular flange 92 on the sleeve 87 tending to urge the sleeve 87 off the rod 88 and consequently rock the lever 85, shaft 83 and toggle to the over dead centre position shown in FIGURE 11 in which the teeth of the dog 80 are locked in engagement with those of the pinion 77. The action of the spring 90 can be overcome by the application of air pressure to a cylinder 93 the closed end of which is pivotally mounted to a bracket 94 fixed to the web 84 and the free end of the piston rod 94 of which is pivoted to the other lever 86. When air is supplied to the cylinder 93 the piston rod is retracted and the toggle is broken. The dog 80 thus moves out of engagement with the teeth of the pinion 77 so that the pinion 63 forming the sector carrier is free to rotate. However, when the sector carrier 63 is locked against rotation relatively to the chassis, upon operation of the locking mechanism shown in FIGURES 11 and 13, the sectors 68 are constrained to pivot about fixed centres with a consequence that the wedge rings 21 and 22 can only rotate in opposite directions relatively to the chassis.

Figure 6:
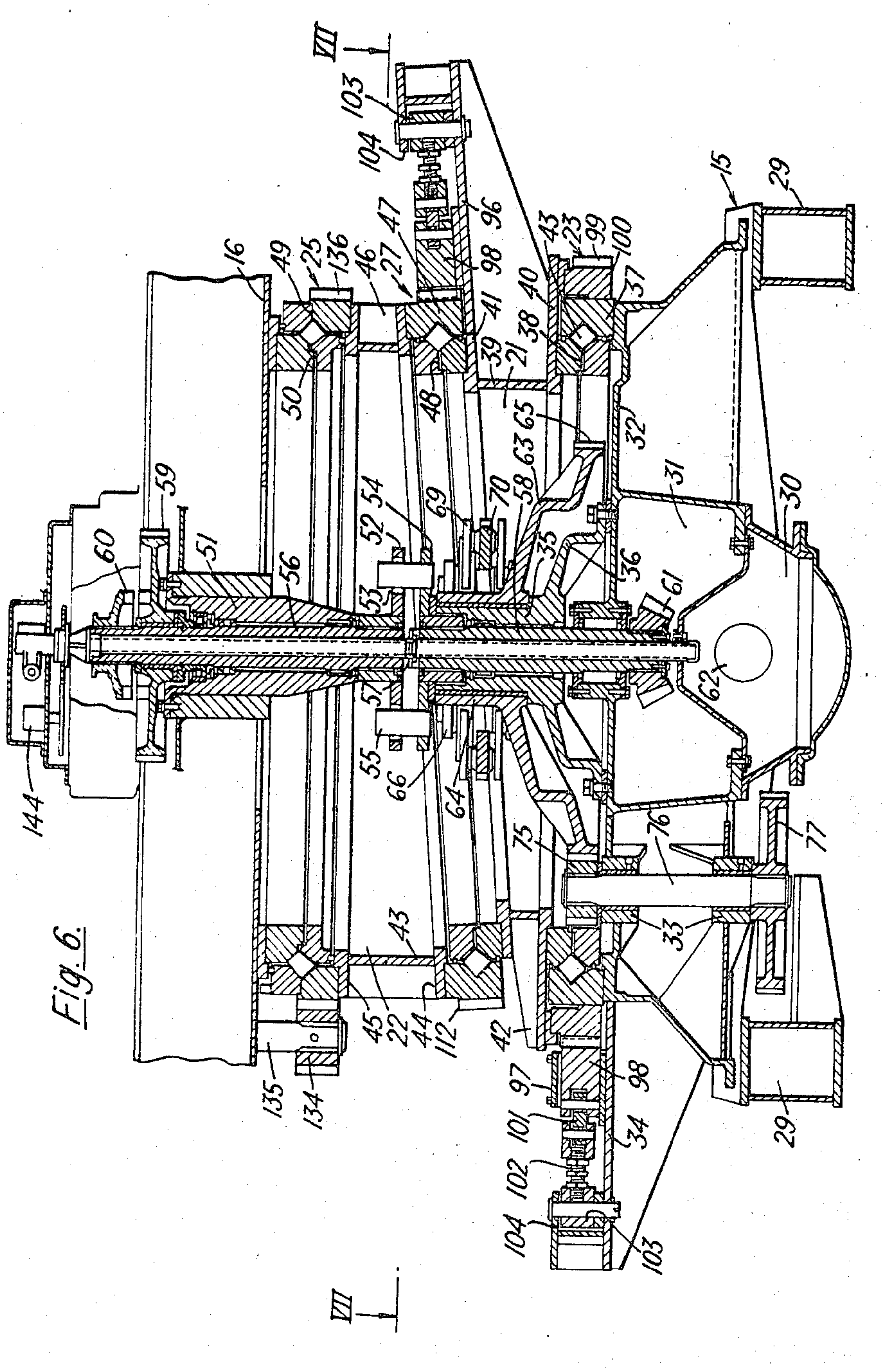
FIGURE 6 is a central longitudinal section through the levelling machinery taken on the line VI—VI in FIGURE 7.

The two wedge rings 21 and 22 can be respectively locked against rotation relatively to the chassis and to the ring 21 by means of separate locking mechanisms. These locking mechanisms, which are similar in construction, are mounted, the one for the wedge ring 21 on the platform 34 and the one for the wedge ring 22 on a platform 96 forming an outward radial extension of the ring 41. As shown in FIGURES 6 and 7, the locking mechanism for the lower wedge ring 21 consists of a linear guide 97 which is fixed to the platform 34 and in which a toothed dog 98 slides into and out of engagement with a ring of teeth 99 formed on the periphery of a ring 100 which is rigidly fixed to the underside of the plate 40. The ring of teeth 99 is coaxial with the axis 24. The dog 98 is mounted on the end of a toggle consisting of a pivotal link 101 and a link 102 of adjustable length, the free end of which is rigidly fixed to a cross head 103 which is pivotally mounted between a bracket 104 and the platform 34. One arm of the crosshead 103 is pivoted to the rod 105 of an air cylinder 106 the other end of which is pivoted to a bracket 107 rigidly fixed to the platform 34. The other arm of the crosshead 103 is pivoted to the end of a sleeve 108 which slides over one end of a rod 109 the other end of which is pivoted to a bracket 110 which is rigidly fixed to the platform 34. A helically coiled compression spring 111 surrounds the rod 109 and acts to urge the sleeve 108 off the rod. The spring 109 tends to rock the crosshead 103 to lock the toggle in the over dead centre position shown in FIGURE 7 with the dog 98 in engagement with the teeth 99. The lock is released by pneumatic extension of the cylinder 106 which overcomes the action of the spring 109 and causes the crosshead 103 to rotate anticlockwise as shown in FIGURE 7, to break the toggle and bring the dog 98 out of engagement with the teeth 99. In other words, the mechanism acts very similarly to that shown in FIGURES 11, 12 and 13, except that the air cylinder has to be extended, rather than retracted, to overcome the spring action.

The locking mechanism for locking the wedge ring 22 against rotation relatively to the wedge ring 21, is virtually identical to that for the wedge ring 21, except that it is mounted on the platform 96 and its dog 98 cooperates with a ring of teeth 112 mounted on the periphery of the ring 47 co-axial with the axis 28. The parts of the locking mechanism are therefore shown in FIGURES 6 and 7 as having the same reference numerals as those of the locking mechanism for the wedge ring 21.

FIGURES 6 and 7 actually show the superstructure and wedge rings slewed relatively to the chassis about the bearing 23 through 180°. This is done to illustrate the locking mechanisms for the two wedge rings more clearly in FIGURE 7 although in the normal travelling position the two locking mechanisms will lie directly over one another at the back of the turret.

Figure 14:
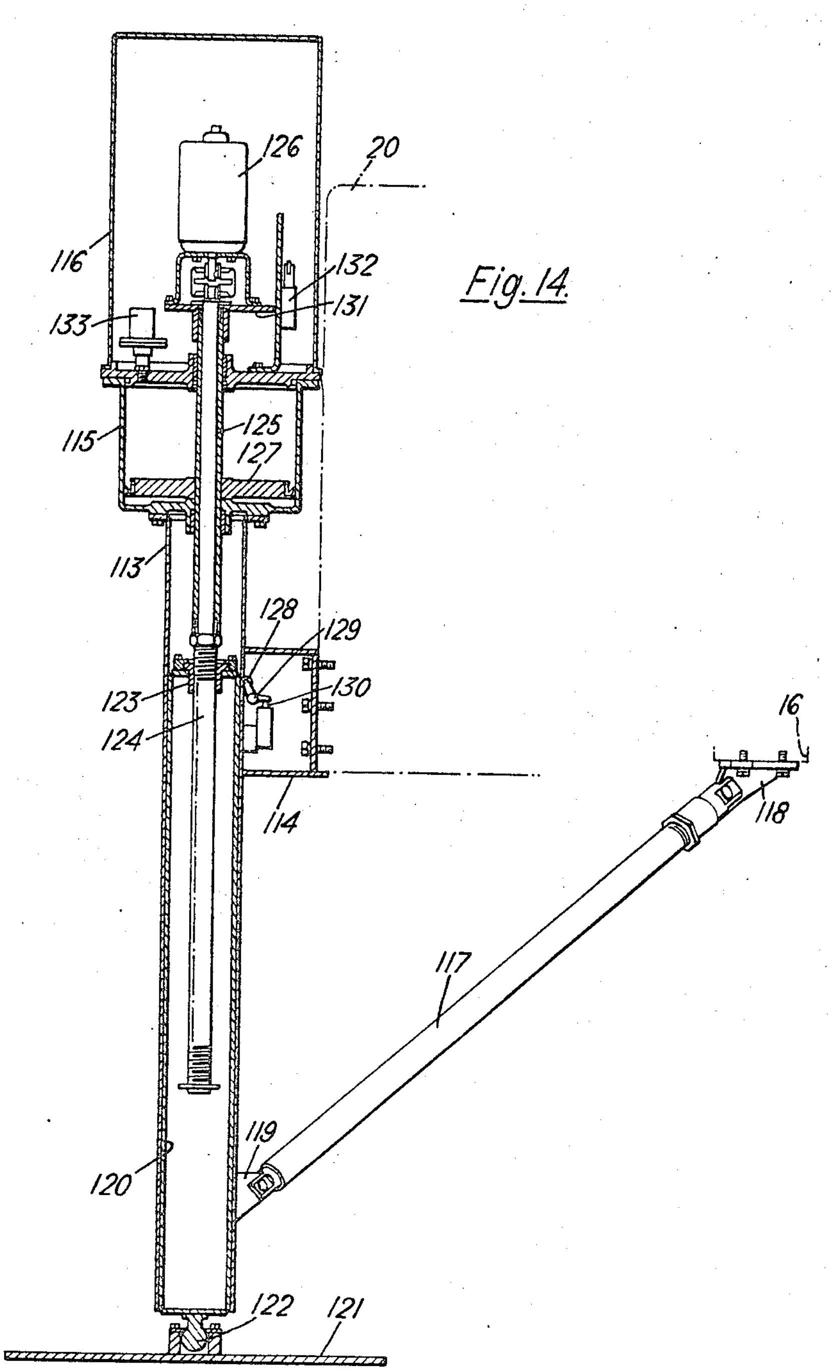
FIGURE 14 is a view, partly in central vertical section and partly in elevation, of a leg carried by the superstructure of the crane.

The superstructure can be locked against rotation relatively to the chassis 15 by means of the extensible leg shown in FIGURE 14. This leg has a tubular casing 113 with a laterally projecting switch housing 114 by means of which the leg is bolted to the back of the counterweight 20. Rigidly fixed at the upper end of the caisng 113 is a cylinder 115 and above that a cylindrical housing 116. The casing 113 is braced from the underside of the bedplate 16 by means of a stay 117 which is of adjustable length and is pivoted at one end to a bracket 118 secured to the bedplate 16 and at the other end to a bracket 119 welded to the casing 113. An inner cylindrical casing 120 slides telescopically within the casing 113 and carries at its lower end an elephant foot 121 through a universal ball joint 122. At its upper end the inner casing 120 is fitted with an internally screw-threaded bush 123 through which is screwed an externally screw-threaded shaft 124 which forms an extension of a driving shaft 125 of an electric motor 126 within the housing 116. A piston 127 is rigidly fixed around the driving shaft 125 within the cylinder 115. The foot 121 can be lowered into engagement with the ground by operation of the motor 126 which rotates the shafts 125 and 124 so that the casing 120 slides telescopically out of the bottom of the casing 113. After the inner casing 120 has been lowered a very short distance within the casing 113, a roller 128, extending on an arm of a bell crank lever, through a slot in the side wall of the casing 113 rides off the top of the peripheral wall of the inner casing 120 and rocks the lever on its pivot 129 allowing a spring-loaded switch plunger 130 to rise and transmit a signal to the operator's cabin that the leg is no longer fully retracted. As soon as the elephant's foot 121 comes into engagement with, and takes a reaction from, the ground, further operation of the motor 126 causes the shafts 124 and 125 to rise within the casing 113, carrying the motor 126 and piston 127 with them. As soon as a striker plate 131 carried by the motor has risen a short way, it operates a switch 132 causing compressed air to be supplied through a valve 133 into the top of the cylinder 115. This air pressure acts through the piston 127, shafts 125 and 124, and inner casing 120 on the elephant's foot 121, ensuring a minimum reaction with the ground at all times. The frictional engagement between the elephant's foot 121 and the ground under this minimum pressure effectively locks the superstructure against rotation relatively to the ground, and hence relatively to the chassis. The position of the leg beneath the counterweight assists in taking some of the weight of the superstructure where it is most useful. It is also situated on the central longitudinal line of the superstructure and the importance of this will be described later.

When the leg shown in FIGURE 14 is raised, the superstructure can be slewed relatively to the ground and chassis through the bearing 25. For this operation the wedge rings 21 and 22 must be locked by their respective locking mechanism against rotation relatively to one another and to the chassis so that no rotation can take place at the bearings 23 and 27. Slewing is accomplished by means of a pinion 134 which is keyed on a shaft 135 driven by a motor on the bedplate 16, the pinion 134 meshing with an annulus gear 136 formed on the lower part of the ring 49 concentric with the rotary axis 26.

When the wedge rings 21 and 22 are rigidly locked relatively to the chassis and the pinion 134 is driven, it takes a reaction from the annulus 136 causing the bedplate 16 and the rest of the superstructure to slew in one direction or the other. However, this same pinion is used for rotating the wedge rings 21 and 22 relatively to the chassis. Thus if the leg shown in FIGURE 14 is lowered into engagement with the ground so that the superstructure cannot slew, the wedge ring locks are released and the pinion 134 is driven, the upper wedge ring 22 will be driven in an appropriate direction relatively to the chassis and superstructure. If the sector carrier locking mechanism is unlocked, upon positive contraction of the cylinder 93, the two wedge rings 21 and 22 can rotate together with the sector carrier in the same sense relatively to the chassis and superstructure. This is particularly important when the abutments 73 and 74 are in engagement with one another as shown in FIGURE 7 and the upper ring is driven in an anti-clockwise direction as seen from above and shown in FIGURE 7. When this happens, the two wedge rings 21 and 22 will rotate in the same sense relatively to the superstructure and chassis with their diameters of maximum slope co-planar and 180° out of phase, as shown in FIGURE 6. If the sector carrier 63 is then locked against rotation relatively to the chassis, upon release of the air pressure in the cylinder 93, and the upper wedge ring 22 is rotated clockwise as seen in FIGURE 7, the meshing sectors 68 will cause the lower wedge ring 21 to rotate by an equal and opposite amount in the anti-clockwise direction so that the abutments 73 and 74 move way from one another. As the two wedge rings rotate in opposite senses relatively to the chassis, away from their out of phase position, a successively increasing angular misorientation will be introduced between the axes 24 and 26.

A sequence of levelling operations on site are shown in FIGURES 1 to 5 which may be read in conjunction with FIGURES 6 and 7. The fact that the chassis in FIGURES 6 and 7 is shown rotated through 180° relatively to the wedge rings and superstructure is irrelevant to FIGURES 1 to 5 because during levelling the chassis provides only a rigid base for the outer race 37 of the bearing 23. FIGURES 1A and 1B shown in plan and in side elevation the tower crane coming to rest having been driven forwards up an upward incline S on site. During travelling the wedge rings 21 and 22 will be locked with their diameters of maximum slope 180° out of phase and lying along the centre line of the machine. The nominal vertical axes of the chassis 15 and superstructure, represented by the axes 24 and 26 will therefore be parallel with one another and when the crane comes to rest these axes will both be inclined at the same angle backwards from the vertical. The levelling operation must level the superstructure relatively to the chassis so that the axis 26 becomes truly vertical, for safe operation at the top of the mast 19, without affecting the angle at which the axis 24 of the chassis is offset to the vertical.

Figure 2A:
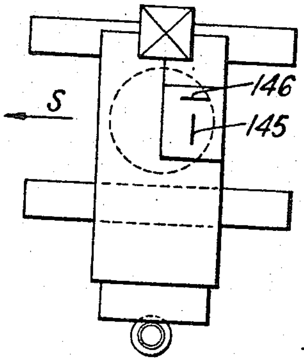
Figure 2B:
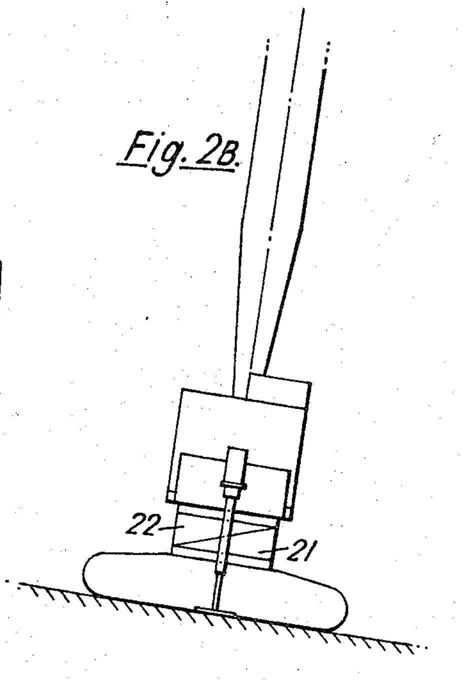

The first stage of the levelling operation involves slewing the superstructure through 90° in a clockwise direction as see from above to the position shown in plan and elevation in FIGURES 2A and 2B. This is the position to which the superstructure must be brought, with its central transverse axis lying along the line of maximum slope S of the ground and the right hand side of the superstructure, including the operator's cabin 18, to the lower side. This slewing operation is brought about by locking the wedge rings 21 and 22 and driving the pinion 134 so that rotation takes place at the bearing 25 until the longitudinal centre line is horizontal as shown by an equilibrium reading of a longitudinal spirit level 145 on the bedplate in the cabin. The leg with the elephant foot 121 is then lowered into frictional engagement with the ground as described, and as shown in FIGURE 2 to lock the superstructure against further rotation relatively to the chassis and ground.

Figure 3:
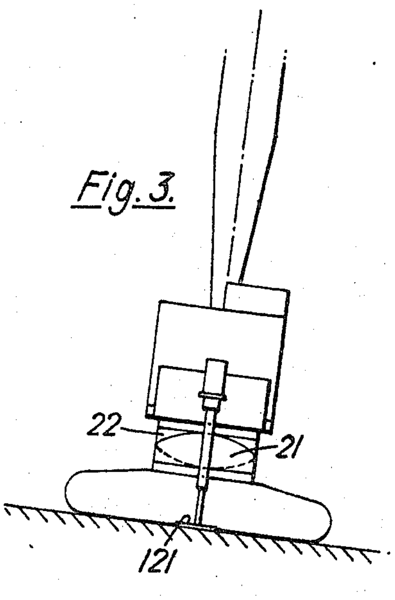

The second stage involves unlocking the sector carrier locking mechanism, by supplying air to the cylinder 93, and unlocking the two wedge ring locks, by supplying air to the cylinders 106, and driving the pinion 134 so that the upper wedge ring 22 is rotated in an anti-clockwise direction as seen from above. Since the abutments 73 and 74 are already in engagement with one another, and the sector carrier 63 is unlocked, the two wedge rings 21 and 22 will be rotated in an anti-clockwise direction together between the superstructure because the two wedge rings will remain with their diameters of maximum slope co-planar and 180° out of phase. This rotation of the wedge rings continues through 270° until the position shown in FIGURE 3 is reached when the plane containing the diameters of maximum slope of the wedge rings lies along the central longitudinal line of the superstructure with the maximum width of the upper ring 22 to the front of the superstructure. This is shown in FIGURE 3. The operator knows when the two rings have reached this position because as the position is reached a cam follower roller 137, shown in FIGURES 9 and 10 mounted on the left hand side of the bedplate, rides on and up to the peak of a cam 138, shown in FIGURES 7, 9 and 10, which is mounted on the upper part of the outer ring 49, of the upper wedge ring 22 at the position shown in FIGURE 7. As the peak of the cam is reached an arm 139 carrying the roller 137 rocks upwards and operates a switch 140 which causes an indicating light to glow in the operator's cabin.

Figure 4:
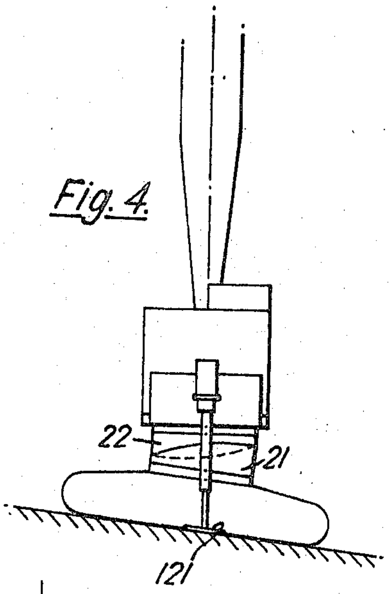
Figures 5, 8:
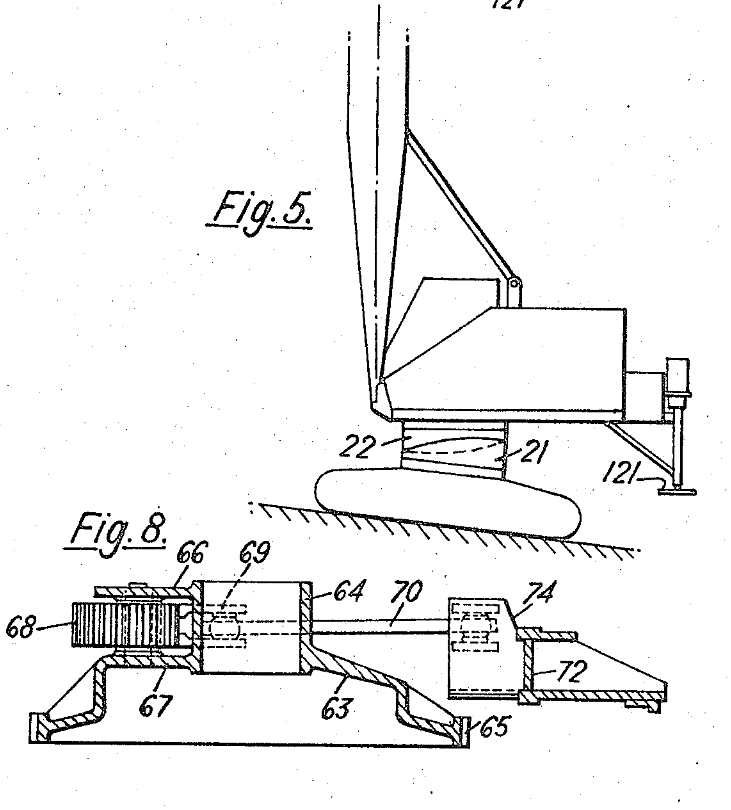
FIGURE 8 is a scrap vertical section of some of the parts of the levelling machinery taken on the line VIII—VIII in FIGURE 7.

The sector carrier 63 is then locked relatively to the chassis, by venting the cylinder 93, and the wedge rings 21 and 22 are maintained unlocked. The upper wedge ring 22 is then driven, in the third stage, in a clockwise direction as seen from above through the pinion 134. Because the sectors 68 are now constrained to rotate about fixed pivots, the lower wedge ring 21 is forced to rotate in an anti-clockwise sense, as seen from above to an equal and opposite amount so that the abutments 73 and 74 move apart from one another. As the two wedge rings rotate, their thickest portions move successively and by equal amounts towards the vertical plane containing the line of maximum slope S of the ground to the lower side of the chassis consequently bringing the bedplate 16 and superstructure slowly up towards the level whilst maintaining the axis 26 in or parallel to the vertical plane containing the line of maximum slope of the ground. This stage involves rotation at all three bearings 23, 27 and 25. The stage continues until the bedplate just reaches the horizontal, as shown by an equilibrium reading on a transverse spirit level 146 on the bedplate. This position is shown in FIGURE 4. The wedge ring locks are then applied and the leg with its elephant foot 121 is raised out of engagement with the ground so that the superstructure is again able to slew freely about the bearing 25 on a rigid turret, as shown in FIGURE 5. However, the setting at which the wedge rings have been locked relatively to one another and the chassis ensures that the axis of the bearing 25 is truly vertical so that the superstructure stays level while slewing.

The illustrated levelling mechanism is able to accommodate a ground slope of up to 1 in 8. In order to prevent the inadvertant rotation of the wedge rings 21 and 22 relatively to one another past the safety limit, should the chassis be standing on a slope of greater than 1 in 8, a second cam 141 is provided on the ring 49, as shown in FIGURE 7, at an agle of 105° from the cam 138. When the rings have rotated through 150° relative to one another, and during the third stage in the levelling operation, and this angle is considered to be maximum safe limit, a cam follower roller 142 similar to the roller 137 and associated with a switch 143 similar to the switch 140, will ride on and up to the peak of the cam 141. The roller 142 is mounted on a plunger 144 and as the roller 142 reaches the peak of the cam 141, the plunger rises and operates a switch 143, causing operation of a movement warning indicator and a warning lamp to shine in the operator's cabin.

The levelling may be carried out automatically to a certain extent. For example, the drive through the pinion 134 may be automatically stopped during the first stage of the levelling when the longitudinal spirit level on the bed plate is in its equilibrium position, during the second stage of levelling when the switch 140 is operated, and during the third stage of levelling when the transverse spirit level on the bed plate reaches its equilibrium position.

In the example shown in FIGURES 1 to 5, the line of maximum slope S coincided with the initial central longitudinal line of the machine. This was chosen for ease of description but is unlikely in practice. However, the initial angle between the centre line of the machine and the line of maximum slope is quite irrelevant to the levelling procedure. In any case the superstructure is slewed to a position in which its transverse axis lies in the vertical plane of maximum slope of the ground, the foot 121 is lowered into engagement with the ground and the second and third stages of the levelling procedure are carried out as before.

If relevelling has to be carried out on site, due perhaps to subsidence, the procedure is gain analogous. In the first stage the superstructure is realigned with the slope and the second and third stages are repeated. During the second stage of the procedure initial anti-clockwise rotation of the upper wedge ring 22 will bring the abutment 73 into engagement with the abutment 74, before carrying the abutment 74, and with it the lower wedge ring 31, into the position relatively to the bedplate at which the switch 140 is operated.

As the superstructure rocks upwards to a truly level position it pivots about an instantaneous axis passing through or adjacent to the leg formed by the casing 113 and 120 so that only a very small, if any, adjustment in the length of this leg will be necessary. During a normal levelling operation this small adjustment is accommodated by the stroke of the piston in the cylinder 115, the air in the cylinder maintaining the constant contact pressure with the ground.

When the superstructure is in position shown FIGURE 2A with the longitudinal spirit level indicating that the longitudinal centre line of superstructure is normal to the slope the driver must set a Desynn Indicator 144 by rotating its outer dial until a marker is in line with an indicator needle prior to levelling. This is necessary to ensure that the driver returns the superstructure back to the correct position before lowering the rear leg to bring the machine back to its normal condition.

We claim:

1. In an apparatus comprising a substructure with a nominal vertical axis, a superstructure with a nominal vertical axis and means for levelling said superstructure relatively to said substructure so that said nominal vertical axis of said superstructure is truly vertical when said nominal vertical axis of said substructure is offset at a small angle to the true vertical; the improved superstructure levelling means which comprises a first intermediate member, a first rotary bearing coupling said intermediate member to said substructure and having an axis of rotation coincidental with said nominal vertical axis of said substructure, a second rotary bearing coupling said intermediate member to said superstructure and having an axis of rotation equally inclined to said nominal vertical axis of said substructure and to said nominal vertical axis of said superstructure, a second intermediate member, mounted on said first intermediate member through said second rotary bearing, a third rotary bearing coupling said superstructure to said secondary intermediate member and having an axis of rotation coincidental with said nominal vertical axis of said superstructure, and means for producing rotation at said first, second and third rotary bearings.

2. Apparatus according to claim 1, wherein said rotary bearings are cross roll bearings each comprising radially inner and outer rings, wall parts of said rings providing between said rings an annular passage of rectangular section divided diagonally by the discontinuity between said rings, and a number of rollers mounted in said passage with the axes of rotation of some of said rollers at 90° to those of other rollers and with the axes of rotation of all said rollers at substantially 45° to the axis of rotation of said bearing.

3. A civil engineering machine according to claim 2, wherein said superstructure includes a bed plate and a motor mounted on said bed plate, and said substructure consists of a crawler mounted chassis, said first and second intermediate members being formed as wedge shaped rings, and a transmission shaft extends from said motor on said bed plate down through said rings to drive crawler tracks of said chassis.

4. Apparatus according to claim 1, further comprising means adapted to lock said first and second intermediate members against rotation relatively to said substructure before and after levelling.

5. Apparatus according to claim 4, wherein said intermediate member locking means comprises first and second toothed gears operatively connected to said first and second intermediate members respectively to rotate therewith relatively to said substructure and at least one fluid cylinder operated dog adapted to be forced into engagement with the teeth of said toothed gears.

6. Apparatus according to claim 4, further comprising gearing interconnecting said first and second intermediate members and adapted to constrain said first and second intermediate members to rotate in opposite senses relatively to said substructure during levelling.

7. Apparatus according to claim 6, wherein said gearing comprises first and second meshing gear sectors, means connecting said gear sectors to said first and second intermediate members respectively, a sector carrier rotatably mounted on said substructure about said nominal vertical axis of said substructure, means rotatably mounting said gear sectors on said sector carrier and means selectively locking said sector carrier against rotation relatively to said substructure, the arrangement being such that when said sector carrier is locked relatively to said substructure, said first and second intermediate members can be rotated in opposite senses to level said superstructure but when said sector carrier is unlocked relatively to said substructure, both said first and second intermediate members are able to rotate in the same sense with said sector carrier relatively to said substructure.

8. Apparatus according to claim 7, wherein said sector carrier locking means comprises a toothed gear connected to said sector carrier and rotatable therewith relatively to said substructure, and a fluid cylinder operated dog adapted to be forced into engagement with the teeth of said toothed gear.

9. Apparatus according to claim 7, comprising means positively driving one of said first and second intermediate members relatively to said substructure whereby said other of said first and second intermediate members is then simultaneously rotated in the opposite sense relatively to said substructure through said gearing interconnecting said first and second intermediate members.

10. Apparatus according to claim 9, further comprising first and second abutments fixedly mounted on said first and second intermediate members respectively, said first and second abutments being adapted to come into engagement with one another when said first and second intermediate members are moved into an orientation relatively to one another about said second rotary bearing such that said nominal vertical axis of said substructure and said nominal vertical axis of said superstructure are parallel with one another, whereby when said sector carrier is unlocked from said substructure and said positively driven intermediate member is rotated relatively to said substructure in a direction to maintain said first and second abutments in engagement with one another, said first and second intermediate members rotate together in the same sense relatively to said substructure without interfering with their relative orientation.

11. Apparatus according to claim 10, wherein said means positively driving one of said first and second intermediate members comprises an annulus gear fixedly mounted on said second intermediate member, concentric with said axis of rotation of said third rotary bearing, a pinion carried by said superstructure and meshing with said annulus gear, means adapted to lock said superstructure against rotation relatively to said superstructure, and means on said superstructure driving said pinion, whereby when said first and second intermediate members are locked and said superstructure is unlocked relatively to said substructure and said pinion is driven said superstructure slews but when said first and second intermediate members are unlocked and said superstructure is locked relatively to said substructure and said pinion is driven said first and second intermediate members rotate relatively to said substructure.

12. Apparatus according to claim 11, wherein said superstructure locking means comprises a leg, means mounting said leg on said superstructure, and means adapted to lower said leg into frictional engagement with the ground.

13. Apparatus according to claim 9, wherein co-operating first cam and cam follower are mounted on said second intermediate member and on said superstructure, and a first switch operated by functional engagement of said first cam and cam follower devices when said abutments are in engagement with one another and said intermediate members are appropriately oriented relatively to said superstructure ready for levelling.

14. Apparatus according to claim 12, in which a second co-operating cam and cam follower are mounted on said second intermediate member and on said superstructure, and a second switch operated by functional cooperation of said second cam and cam follower when said first and second intermediate members have rotated in opposite senses relatively to said superstructure and and superstructure during levelling away from said position in which said first switch is operated by a predetermined limiting angle for safety.

References Cited

UNITED STATES PATENTS 2,790,648 4/1957 Sweetland ------------ 280—6

PHILIP GOODMAN, *Primary Examiner.*